United States Patent
Meverden et al.

(10) Patent No.: US 6,541,583 B2
(45) Date of Patent: Apr. 1, 2003

(54) POLYPROPYLENE PREPARATION

(75) Inventors: Craig C. Meverden, Mason, OH (US); Sandor Nagy, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 153 days.

(21) Appl. No.: 09/859,332

(22) Filed: May 17, 2001

(65) Prior Publication Data

US 2002/0193535 A1 Dec. 19, 2002

(51) Int. Cl.[7] .............. C08F 4/64; C08F 4/68; C08F 110/06
(52) U.S. Cl. .......... 526/127; 526/161; 526/172; 526/943
(58) Field of Search .............. 526/127, 161, 526/172, 351, 943

(56) References Cited

U.S. PATENT DOCUMENTS 5,594,080 A * 1/1997 Waymouth et al. ......... 526/126
5,747,621 A 5/1998 Resconi et al. .............. 526/351
5,756,614 A 5/1998 Chien et al. ................. 526/160
5,945,496 A 8/1999 Resconi ....................... 526/351
6,232,260 B1 * 5/2001 Nagy et al. ................... 502/15

FOREIGN PATENT DOCUMENTS

WO    WO 92/24446    5/1999

* cited by examiner

Primary Examiner—David W. Wu
Assistant Examiner—R. Rabago
(74) Attorney, Agent, or Firm—Shao Guo

(57) ABSTRACT

A propylene polymerization process is disclosed. The process gives polypropylene having isotactic and atactic stereoblock sequences. The process is performed in the presence of a non-bridged bisindenoindol-based single-site catalyst. The polypropylene produced has an isotactic pentad (mmmm) content within the range of about 10 mole % to about 70 mole %.

14 Claims, No Drawings

POLYPROPYLENE PREPARATION

FIELD OF THE INVENTION

The invention relates to the preparation of polypropylene. In particular, the invention relates to the preparation of polypropylene that has isotactic and atactic stereoblock sequences.

BACKGROUND OF THE INVENTION

Polypropylene differs from polyethylene because there is a methyl group attached to every other carbon atom of the polypropylene backbone. Depending upon the locations of the methyl groups, polypropylene can be divided into three types: isotactic, syndiotactic, and atactic.

Isotactic polypropylene has been commercially produced for decades with Ziegler catalysts. Single-site catalysts are also suitable for the preparation of isotactic polypropylene. For instance, WO 99/24446 teaches the use of bridged indenoindolyl-based single-site catalysts to prepare polypropylene that has an isotactic content greater than 90%. Isotactic polypropylene readily forms crystalline structure. It has excellent chemical and heat resistance and has been mainly used for textile fibers and films.

Unlike isotactic polypropylene, atactic polypropylene is amorphous. It has better toughness but less chemical and heat resistance than isotactic polypropylene. It is mainly used in adhesives. Although atactic polypropylene can be made directly by polymerization (see, e.g., U.S. Pat. No. 5,945,496), it is usually a by-product of isotactic polypropylene production.

It is of significant interest to combine isotactic and atactic polypropylene because they have complementary properties. However, physically blending these polymers offers little benefit because they are not readily compatible. Preparation of polypropylene having both isotactic and atactic sequences in the same polymer chain would be an ideal way to combine these two polymers. However, it is difficult to find a catalyst that can alternately grow isotactic and atactic sequences.

U.S. Pat. No. 5,594,080 teaches the use of aryl-indenyl-based single-site catalysts to prepare polypropylene that has both isotactic and atactic sequences. The polypropylene contains about 20% or less of isotactic structure.

U.S. Pat. No. 5,747,621 also teaches the preparation of polypropylene that has both isotactic and atactic components. However, these components are mainly not incorporated into the same polymer chain. Rather, they are physically blended.

U.S. Pat. No. 5,756,614 teaches the preparation of stereoblock polypropylene using an asymmetric stereorigid metallocene catalyst. The catalyst possesses two exchangeable catalytic sites with different stereochemical reactivity. Thus, an isotactic/atactic stereoblock polypropylene is prepared. The polymer shows promising performance as a thermoplastic elastomeric material. However, the catalyst is complicated and expensive to make.

In sum, there is an increasing interest in ways to make isotactic-atactic stereoblock polypropylene. Ideally, the preparation would use a readily available and inexpensive single-site catalyst.

SUMMARY OF THE INVENTION

The invention is a propylene polymerization process. The process uses a Group 3–5 transition metal catalyst that has two non-bridged indenoindolyl ligands. The catalyst is activated. The invention provides a simple but effective route to polypropylene that has isotactic and atactic stereoblock sequences. In contrast to known processes, the process of the invention does not require complicated bridged catalysts; nor does it require blending an isotactic polypropylene with atactic polypropylene. The polypropylene produced has an isotactic pentad (mmmm) content within the range of about 10 mole % to about 70 mole % and is suitable for the use as thermoplastic elastomeric material.

DETAILED DESCRIPTION OF THE INVENTION

The process of the invention comprises polymerizing propylene in the presence of a Group 3–5 transition metal catalyst. The catalyst has two indenoindolyl ligands. By "indenoindole compound," we mean an organic compound that has both indole and indene rings. The five-membered rings from each are fused, i.e., they share two carbon atoms. The indenoindolyl ligands are not bridged to each other.

The catalyst preferably has the general structure

where M is a Group 3–5 transition metal. Preferably, M is zirconium. The indenoindolyl ligands, $L_1$ and $L_2$, are Π-bonded to M. $L_1$ and $L_2$ can be the same or different and have the following alternative structures:

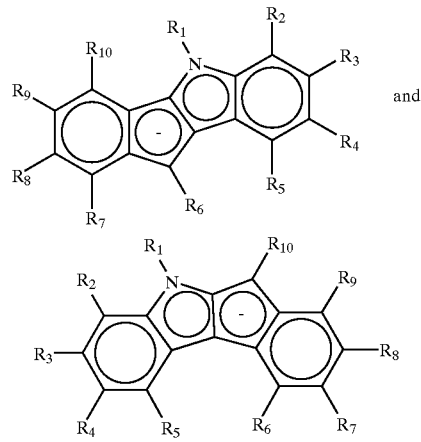

$R_1$ is preferably selected from the group consisting of alkyl, aryl, aralkyl, and silyl groups. Examples are methyl, t-butyl, phenyl, and tri-methyl silyl groups. $R_2$ through $R_{10}$ are the same or different and are preferably selected from the group consisting of hydrogen, alkyl, aryl, aralkyl, silyl, halogen, alkoxy, aryloxy, siloxy, thioether, nitro, amino groups, and the like.

The catalyst has two other ligands, $X_1$ and $X_2$. $X_1$ and $X_2$ can be the same or different. They are preferably selected from the group consisting of halogen, alkoxy, aryloxy, siloxy, dialkylamino, diarylamino, and hydrocarbyl groups. Labile ligands such as halogen are particularly preferred.

Examples of suitable catalysts include bis-(2-chloro-5-phenyl-5,10-dihydroindeno [1,2-b]indolyl)zirconium dichloride (Structure I), bis-(5-phenyl-5,10 -dihydroindeno [1,2-b]indolyl)zirconium dichloride (Structure II), bis-(5,8-dimethyl-5,10-dihydroindeno[1,2-b]indolyl)zirconium dichloride (Structure III), and bis-(5-trimethylsilyl-8-methyl-5,10-dihydroindeno[1,2-b]indolyl)zirconium dichloride (Structure IV).

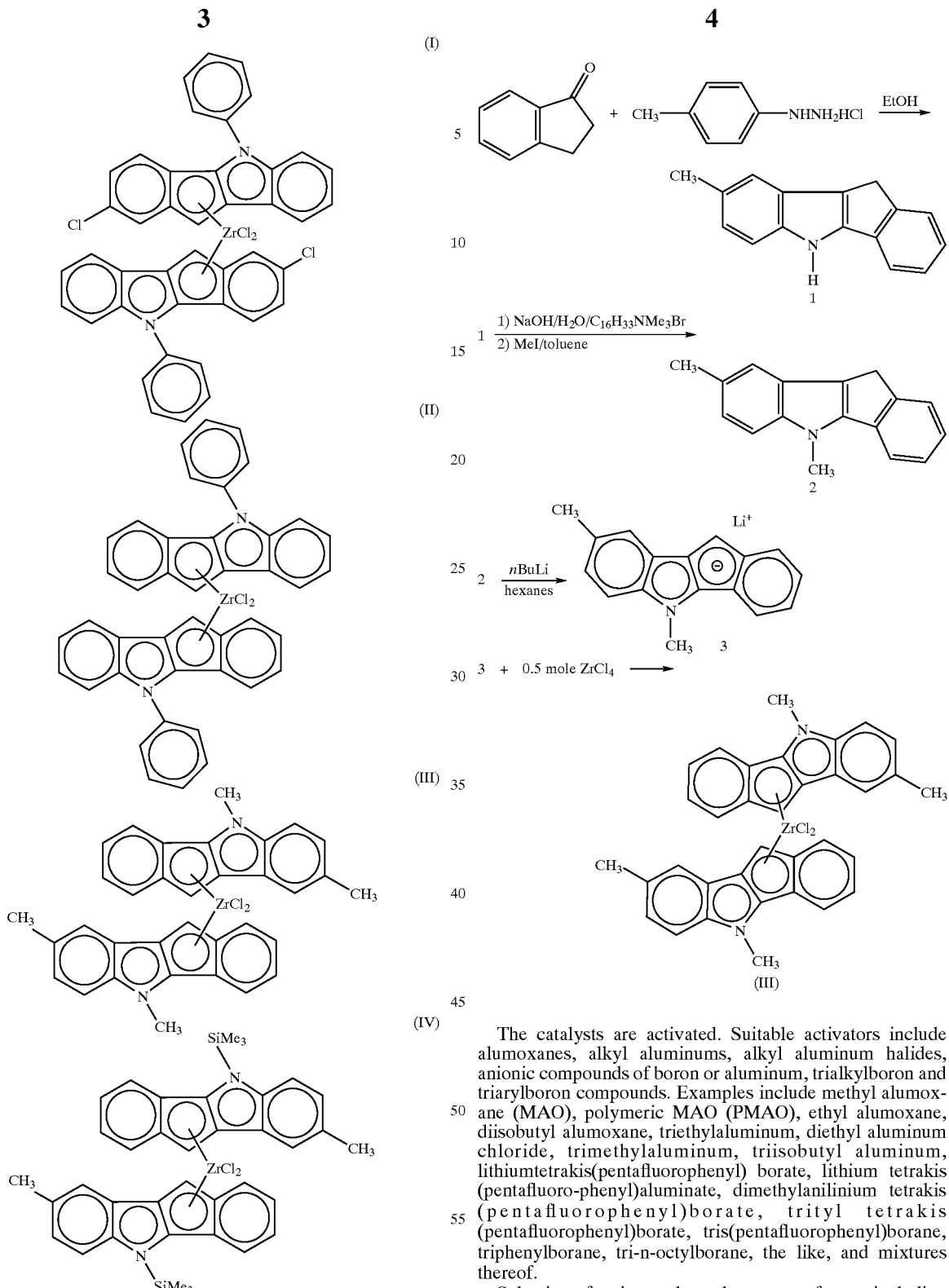

The catalysts can be prepared by any known method. For instance, co-pending application Ser. No. 09/417,510, now U.S. Pat. No. 6,232,260, the teachings of which are incorporated herein by reference, teaches in great detail how to prepare indenoindole-based catalysts. For instance, Catalyst III can be made according to the following scheme:

The catalysts are activated. Suitable activators include alumoxanes, alkyl aluminums, alkyl aluminum halides, anionic compounds of boron or aluminum, trialkylboron and triarylboron compounds. Examples include methyl alumoxane (MAO), polymeric MAO (PMAO), ethyl alumoxane, diisobutyl alumoxane, triethylaluminum, diethyl aluminum chloride, trimethylaluminum, triisobutyl aluminum, lithiumtetrakis(pentafluorophenyl) borate, lithium tetrakis(pentafluoro-phenyl)aluminate, dimethylanilinium tetrakis(pentafluorophenyl)borate, trityl tetrakis(pentafluorophenyl)borate, tris(pentafluorophenyl)borane, triphenylborane, tri-n-octylborane, the like, and mixtures thereof.

Selection of activator depends on many factors including the catalyst used and the desired isotactic/atactic ratio of the polypropylene product. For instance, when bis(2-chloro-5-phenyl-5,10-dihydroindeno[1,2-b]indolyl) zirconium dichloride is used as a catalyst and MAO as an activator, the polypropylene produced has an isotactic pentad content of about 50% (see Example 1), while using a combination of triisobutyl aluminum and trityltetrakispentafluorophenylborate as activator, the isotactic pentad content is about 20% (Example 12).

Optionally, the catalyst is immobilized on a support. The support is preferably a porous material such as inorganic oxides and chlorides, and organic polymer resins. Preferred inorganic oxides include oxides of Group 2, 3, 4, 5, 13, or 14 elements. Preferred supports include silica, alumina, silica-aluminas, magnesias, titania, zirconia, magnesium chloride, and crosslinked polystyrene.

Many types of propylene polymerization processes can be used. The process can be practiced in the gas phase, bulk, solution, or slurry. The polymerization can be performed over a wide temperature range. Preferably, the temperature is within the range of about 0° C. to about 150° C. A more preferred range is from about 25° C. to about 100° C.

The process of the invention gives polypropylene products having controlled stereochemical configurations and physical properties. It provides a simple but effective way to tailor the isotactic/atactic ratio of polypropylene. The invention eliminates the need of complicated bridged catalysts. The polypropylene of the process has a broad range of isotactic pentad content (about 10 mole % to about 70 mole %) and are useful materials for films, adhesives, and other elastomeric objects.

The following examples merely illustrate the invention. Those skilled in the art will recognize many variations that are within the spirit of the invention and scope of the claims.

EXAMPLE A

Preparation Of Catalyst I: Bis(2-chloro-5-phenyl-5, 10-dihydroindeno[1,2-b]indolyl)zirconium Dichloride In a 100 mL round bottom flask, 50 ml ethanol, 4 ml $H_2SO_4$, 5.09 grams 5-chloro 1-indanone (0.0306 moles) and 6.74 grams N, N-diphenylhydrazine hydrochloride (0.0306 moles) are mixed and heated to reflux for 4 hours. A brown solid is isolated upon cooling from the reaction mixture and recrystallized from ethanol to yield 7.55 grams of the product (72% yield).

Under a dry nitrogen atmosphere, 2.37 grams (0.0075 moles) of 2-chloro-5-phenyl-5,10-dihydroindeno[1,2-b] indole is slurried in 40 mL of hexane. To the slurry is added 5.6 mL of a 2.0 mole/L solution of n-butyllithium in cyclohexane. The mixture is stirred at room temperature under a nitrogen atmosphere for 67 hours. The resulting yellow solid is filtered, washed with hexane and dried under vacuum (1.8 grams, 67% yield).

The above lithium salt (0.9 grams, 0.0028 moles) is dissolved in a mixture of 4 mL of toluene and 0.5 mL of diethylether. Zirconium tetrachloride (0.34 grams, 0.0014 moles) is slurried in a mixture of 10 mL diethylether and 4 mL toluene. The lithium salt solution is slowly added into the slurry under a dry nitrogen atmosphere at 25° C. The mixture is then stirred at 25° C. for 40 hours. The resulting orange solid is filtered, washed with diethylether and dried under vacuum (0.72 grams, 58% yield).

EXAMPLE B

Preparation of Catalyst II: Bis(5-phenyl-5,10-dihydroindeno[1,2-b]indolyl)zirconium Dichloride The general procedure of Example A is followed. The reaction of 1-indanone and N,N-diphenylhydrazine hydrochloride gives 5-phenyl 5,10-dihydroindeno[1,2-b]indole. It then reacts with n-butyllithium to produce its lithium salt, which in turn reacts with zirconium tetrachloride to produce Catalyst II.

EXAMPLE C

Preparation of Catalyst III: Bis-(5,8-dimethyl-5,10-dihydroindeno[1,2-b]indolyl)zirconium Dichloride In a 250 mL round bottom flask, 180 mL of ethanol, 10 mL of HCl, 16.3 grams of 1-indanone (0.124 mole) and 19.5 grams of p-methylphenylhydrazine hydrochloride (0.124 mole) are heated to reflux for six hours. After cooling to 25° C., the resulting precipitate is filtered, washed twice with 100 mL of 10% aqueous ethanol, twice with 50 mL of water, and then twice with 50 mL of hexane. After drying, 25 grams of 8-methyl-5, 10-dihydroindeno[1,2-b]indole is obtained.

To a 100 mL of 50% aqueous NaOH solution is added 0.5 gram of trimethylcetylammonium bromide, 6.1 grams of 8-methyl-5, 10-dihydroindeno[1,2-b]indole, and then 100 mL of toluene with vigorous stirring. Methyl iodide (1.8 mL) is then added. The mixture is stirred for three hours at 25° C. and then heated at 100° C. for 30 minutes. After cooling to 25° C., two layers are formed: a pale yellow organic layer and an aqueous layer. They are separated. The precipitate in the organic layer is filtered. The aqueous layer is extracted with toluene, which is then combined with the organic layer, the mixture is then dried over $Na_2SO_4$, and filtered. The resulting solution is concentrated till a solid is formed. The solid is isolated from the solution, and combined with the previously collected solid product. The combined solid is washed with ethanol and then with hexane and dried, yielding 3.05 grams of 5,8-dimethyl-5,10-dihydroindeno[1,2-b]indole.

Under the nitrogen protection, 1.52 grams (0.0077 mole) of 5,8-dimethyl-5,10-dihydroindeno[1,2-b]indole is dissolved in 15 mL of toluene. To the solution is added 3.9 mL of n-butyllithium solution in pentane (2.0 mole/L). The mixture is refluxed for three hours and then cooled to 25° C. The precipitate is isolated by filtration, washed with hexane, and dried under vacuum, yielding 1.26 grams of 5,8-dimethyl-5,10-dihydroindeno [1,2-b]indolyllithium.

Under the nitrogen protection, 0.24 gram (0.001 mole) of 5,8-dimethyl-5,10-dihydroindeno[1,2-b]indolyllithium is dissolved in 20 mL of diethylether. The solution is slowly added to zirconium tetrachloride (0.12 gram, 0.0005 mole) slurry in 20 mL of diethylether. The mixture is stirred at 25° C. for two hours, filtered, washed with diethylether and dried under vacuum, yielding 0.23 gram of Catalyst III.

EXAMPLE D

Preparation Of Catalyst IV: Bis(5-trimethylsilyl-8-methyl-5,10-dihydroindeno[1,2-b]indolyl)zirconium Dichloride The general procedure of Example A is followed. 8-Methyl-5, 10-dihydroindeno[1,2-b]indole reacts with n-butyllithium and the product then reacts with trimethylchlorosilane to form 5-trimethylsilyl-8-methyl-5, 10-dihydroindeno[1,2-b]indole. The later reacts with n-butyllithium to form a lithium salt, which reacts with zirconium tetrachloride to give Catalyst IV.

EXAMPLES 1–12

Preparation of Polypropylene Having Isotactic and Atactic Stereoblock Sequences

Polymerizations are performed in a 1L stainless-steel stirred reactor. Dry, oxygen-free propylene (350 mL) is charged to the clean, dry, oxygen-free reactor at room temperature. The specified amount (from Table 1 below) of activator is then added to the reactor along with 50 mL of liquid propylene. The reactor is heated to the desired reaction temperature and allowed to equilibrate. The desired quantity of catalyst is then injected into the reactor with another 50 mL of liquid propylene to start the polymerization. The polymerization is carried out for one hour. At the end of the polymerization the reactor is vented to remove the remaining propylene. The polymer is removed from the reactor, soaked overnight in methanol, filtered and dried. Table 1 gives the polymerization conditions and the polymer properties.

EXAMPLE 13

The general procedure of Examples 1–12 is repeated using Catalyst III and MAO activator but one-half of MAO is added directly to the reactor and another half is pre-mixed with the catalyst for 30 minutes before added to the reactor. The polypropylene produced has 40% isotactic pentads.

COMPARATIVE EXAMPLE 14

Preparation of Polypropylene With (5,8-dimethyl-5,10-indeno[1,2-b]indolyl)(Cp)ZrCl$_2$ The procedure of Example 13 is repeated but a mono-indenoindole catalyst, (5,8-dimethyl-5,10-indeno[1,2-b]indolyl)(Cp)ZrCl$_2$, is used. The polypropylene produced has only 8% isotactic pentads, while the polypropylene of Example 13 has 40% isotactic pentads (see Table 2).

We claim:

1. A process that comprises polymerizing propylene in the presence of an activator and a Group 3–5 transition metal catalyst that has two non-bridged indenoindolyl ligands; wherein the resulting polypropylene has isotactic and atactic stereoblock sequences and an isotactic pentad (mmmm) content within the range of about 10 mole % to about 70 mole %.

2. The process of claim 1 wherein the catalyst has the general structure

wherein M is a Group 3–5 transition metal; $X_1$ and $X_2$ are the same or different and are selected from the group consisting of halogen, alkoxy, aryloxy, siloxy, dialkylamino and hydrocarbyl ligands; $L_1$ and $L_2$ are the same or different and are selected from the group consisting of

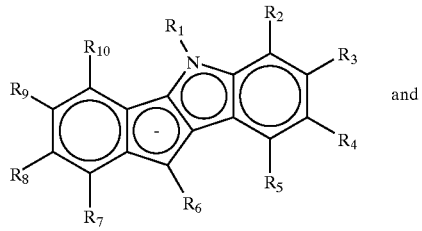

and

TABLE 1

Polymerization Conditions and Polymer Properties

| Ex. | Cat | Activator | Activator/Cat | Temp °C. | KgPP/mol Zr | Mw$^a$ | Mw/Mn$^a$ | mmmm %$^b$ | T$_m$$^c$ °C. |
|---|---|---|---|---|---|---|---|---|---|
| 1 | I | MAO | 2000 | 25 | 7125 | 75,400 | 2.8 | 0.50 | 146.1 |
| 2 | II | MAO | 2000 | 25 | 1115 | 85,900 | 6.1 | 0.26 | 150.7 |
| 3 | III | MAO | 2000 | 25 | 240 | 46,000 | 5.9 | 0.34 | 72.7 |
| 4 | IV | MAO | 2000 | 25 | 430 | 59,300 | 3.4 | 0.28 | — |
| 5 | I | MAO | 5000 | 25 | 11750 | 54,100 | 3.3 | 0.49 | 148.4 |
| 6 | II | MAO | 5000 | 25 | 2060 | 61,700 | 6.3 | 0.26 | 149.9 |
| 7 | III | MAO | 5000 | 25 | 90 | 19,500 | 6.6 | — | — |
| 8 | IV | MAO | 5000 | 25 | 260 | 72,200 | 3.4 | — | — |
| 9 | I | MAO | 5000 | 50 | 4030 | 28,500 | 6.9 | 0.50 | 147.3 |
| 10 | I | MAO | 5000 | 70 | 5750 | 9,200 | 6.1 | 0.41 | 122.2 |
| 11 | I | MAO | 2000 | 50 | 3030 | 54,500 | 8.8 | 0.54 | 147.4 |
| 12 | I | * | * | 25 | 5460 | 215,600 | 2.7 | 0.2 | 128.0 |

$^a$Determined by GPC vs. polystyrene.
$^b$Determined by $^{13}$C-NMR.
$^c$Determined by DSC.
*The activator is a mixture of triisobutyl aluminum and trityltetrakispentafluorophenylborate, in a ratio of Al/borate/Zr = 300/2/1.

TABLE 2

Polymerization Conditions and Polymer Properties

| Ex. | Cat | Activator | Activator/Cat | Temp °C. | KgPP/mol Zr | Mn | Mw/% | mmmm °C. | T$_m$ |
|---|---|---|---|---|---|---|---|---|---|
| 13 | III | MAO | 2000 | 25 | 440 | 34,600 | 2.6 | 0.40 | 151.1 |
| C14 | * | MAO | 2000 | 25 | 440 | 13,800 | 2.7 | 0.08 | — |

*The catalyst is (5,8-dimethyl-5,10-indeno[1,2-b]indolyl)(Cp)ZrCl$_2$

-continued

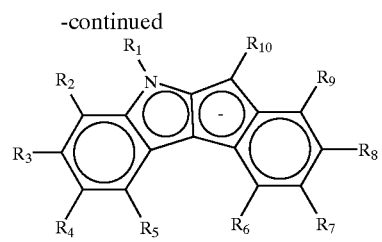

wherein $R_1$ is selected from the group consisting of alkyl, aryl, aralkyl, and silyl groups; $R_2$ through $R_{10}$ are the same or different and selected from the group consisting of hydrogen, alkyl, aryl, aralkyl, silyl, halogen, alkoxy, aryloxy, siloxy, thioether, nitro, dialkyl amino, and diaryl amino groups.

3. The process of claim 1 wherein the activator is selected from the group consisting of alumoxanes, alkyl aluminums, alkyl aluminum halides, anionic compounds of boron or aluminum, trialkylboron, triarylboron compounds, and mixtures thereof.

4. The process of claim 2 wherein $X_1$ and $X_2$ are chlorine.

5. The process of claim 2 wherein $R_1$ is phenyl.

6. The process of claim 2 wherein M is zirconium.

7. The process of claim 3 wherein the activator is an alumoxane.

8. The process of claim 3 wherein the activator is a mixture of a trialkylaluminum and trityltetrakispentafluorophenylborate.

9. A process, comprising polymerizing propylene in the presence of:

(a) a non-bridged catalyst that has the general structure of

wherein M is a Group 3–5 transition metal; $L_1$ and $L_2$ are the same or different and selected from the group consisting of:

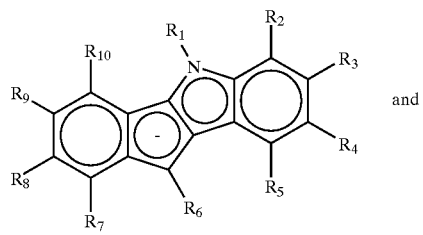

and

-continued

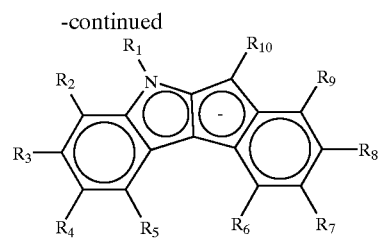

wherein $R_1$ is selected from the group consisting of alkyl, aryl, aralkyl, and silyl groups; $R_2$ through $R_{10}$ are the same or different and selected from the group consisting of hydrogen, alkyl, aryl, aralkyl, silyl, halogen, alkoxy, aryloxy, siloxy, thioether, nitro, dialkyl amino and diaryl amino groups; and (b) an alumoxane activator; wherein the resulting polypropylene has isotactic and atactic stereoblock sequences and an isotactic pentad (mmmm) content within the range of about 10 mole % to about 70 mole %.

10. The process of claim 9 wherein $R_1$ is phenyl.

11. The process of claim 9 wherein M is zirconium.

12. The process of claim 9 wherein the polymerization is carried out at a temperature within the range of about 0° C. to 150° C.

13. The process of claim 9 wherein the polymerization is carried out at a temperature within the range of about 25° C. to about 100° C.

14. A process, comprising polymerizing propylene in the presence of a catalyst that has the general structure

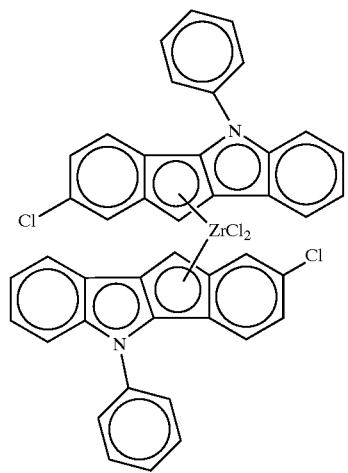

and an alumoxane activator; wherein the resulting polypropylene has isotactic and atactic stereoblock sequences and an isotactic pentad (mmmm) content within the range of about 40 mole % to about 60 mole %.

* * * * *